(12) United States Patent
Ding et al.

(10) Patent No.: US 6,907,038 B2
(45) Date of Patent: Jun. 14, 2005

(54) METHOD FOR PACKET TRANSMISSION OF MULTIMEDIA DATA IN A NETWORK

(75) Inventors: Jen-Wen Ding, Taichung (TW);
Juei-Sheng Hong, Changhua (TW);
Yueh-Min Huang, Nantou (TW);
Jen-Chi Liu, Hsinchu (TW);
Muh-Linag Wang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 869 days.

(21) Appl. No.: 09/909,811

(22) Filed: Jul. 23, 2001

(65) Prior Publication Data

US 2002/0136219 A1 Sep. 26, 2002

(30) Foreign Application Priority Data

Mar. 21, 2001 (TW) ........................................ 90104620 A

(51) Int. Cl.$^7$ ........................... H04L 12/28; H04L 12/56
(52) U.S. Cl. ........................................... 370/395; 725/90
(58) Field of Search ............................. 370/395, 395.1, 370/395.64, 470, 473, 82, 105.1, 111.527, 394, 393, 912; 725/86, 87, 93, 98, 92, 90, 118, 119; 348/423.1; 375/240.01, 240.26, 240.14, 240.25; 386/112, 109, 95, 104, 108; 341/55

(56) References Cited

U.S. PATENT DOCUMENTS

| | | | | |
|---|---|---|---|---|
| 6,069,993 A | * | 5/2000 | Kawara | 386/68 |
| 6,081,649 A | * | 6/2000 | Asamura et al. | 386/81 |
| 6,504,850 B1 | * | 1/2003 | Kato et al. | 370/465 |
| 6,580,869 B1 | * | 6/2003 | Ando et al. | 386/68 |
| 6,654,421 B2 | * | 11/2003 | Hanamura et al. | 375/240.26 |
| 6,731,685 B1 | * | 5/2004 | Liu et al. | 375/240.14 |
| 6,785,464 B1 | * | 8/2004 | Kato | 386/52 |
| 6,795,397 B2 | * | 9/2004 | Varma et al. | 370/230.1 |
| 6,795,499 B1 | * | 9/2004 | Kato et al. | 375/240.01 |
| 2001/0002851 A1 | * | 6/2001 | Shimada et al. | 348/423.1 |
| 2001/0033619 A1 | * | 10/2001 | Hanamura et al. | 375/240.26 |
| 2002/0073224 A1 | * | 6/2002 | Varma et al. | 709/233 |

* cited by examiner

Primary Examiner—Wellington Chin
Assistant Examiner—Jamal A. Fox
(74) Attorney, Agent, or Firm—Rabin & Berdo, P.C.

(57) ABSTRACT

A method for packet transmission of multimedia data in a network is provided. The method is used for transmitting a group of pictures (GOP) including a plurality of frames, wherein each frame includes a plurality of packets, and the plurality of frames are of N types of frame. The method includes the following steps. (a) Set i to one, where i is a positive integer. (b) Form an i-th transmission sequence by arranging the packets of the i-th type of frame. (c) Form an (i+1)-th transmission sequence by putting the packets of the (i+1)-th type of frame between packets of the i-th transmission sequence consecutively. (d) Increment i by one. (e) Repeat steps (c) to (d) until i is equal to N. (f) Transmit the N-th transmission sequence.

17 Claims, 9 Drawing Sheets

(a) iiiiiippppppppppbbbbbbbbb

FIG. 3A (PRIOR ART)

(b) iiiiiippppppppppbbbbb|bbbb  — 302

FIG. 3B (PRIOR ART)

(c) iiiiiippppp|pppppbbbbbbbbb  — 304

FIG. 3C (PRIOR ART)

(d) iiiiii|ppppppppppbbbbbbbbb  — 306

FIG. 3D (PRIOR ART)

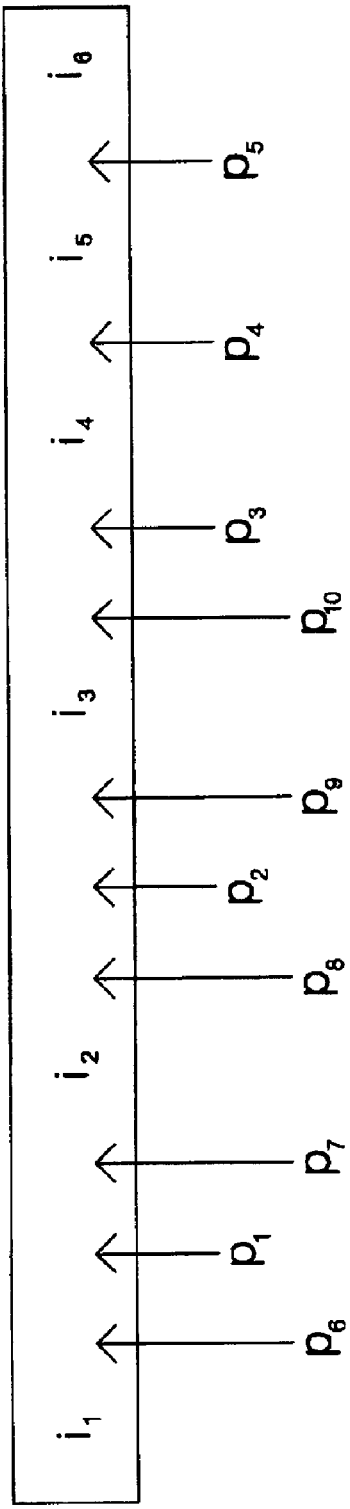
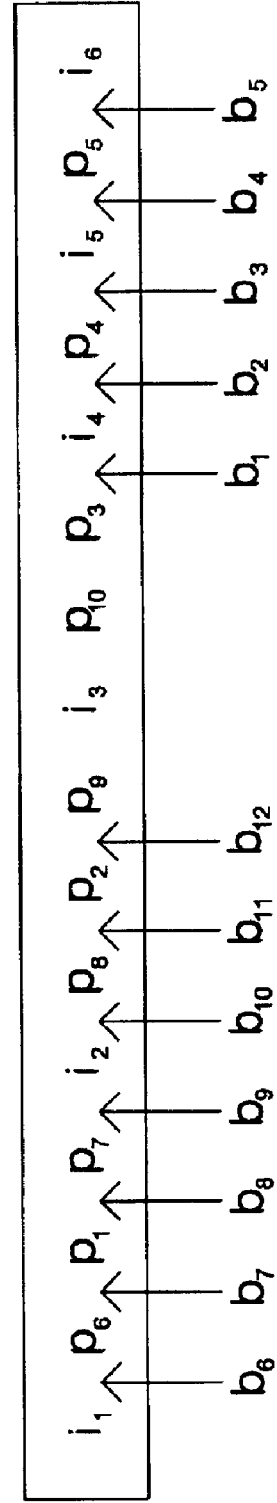
FIG. 5A (a)
FIG. 5B (b)

METHOD FOR PACKET TRANSMISSION OF MULTIMEDIA DATA IN A NETWORK

This application incorporates by reference Taiwanese application Ser. No. 90104620, filed on Mar. 21, 2001.

BACKGROUND OF THE INVENTION

1. Field of the Invention

The invention relates in general to a data transmission method, and more particularly to a method for transmitting multimedia data packets in a network.

2. Description of the Related Art

Nowadays, transmitting multimedia information combining text, audio, picture, and video via a network is a very common network usage. Network users is expected to enjoy more and more multimedia services using the network as media. For instance, by using a "video on demand" (VOD) service, people can watch their favorite video or multimedia information immediately at any time by downloading via the network. Thus, people will not need to go to the cinema, or to go to the video shop for renting a video tape, or video compact disk for watching at home. It is thanks to the development of network technology that brings people more efficient, more convenient, and better quality services.

Referring to FIG. 1, it illustrates a conventional network transmission system. A transmission end 102 first dissembles data to be transmitted, denoted as data_in, into a set of packets 103. An encoder 104 of transmission end 102 then encodes the set of packets 103. After that, the encoded packets 103 are sent to a router 108 in a network 106. On receiving packets 105, router 108 obtains the destination of the packets, determines a route for corresponding packets 109, and sends them to the destination, a receiving end 110. Finally, the required data are obtained at receiving end 110 by using a decoder 110 of receiving end 110 to decode packets 111.

Since the bandwidth of the network is fixed, only a maximum number of data are allowed to be transmitted. If there are too many data transmitting over the network, congestion occurs. When serious congestion occurs so that the router has to receive a large number of packets at a time in excess of the number of packets that the router can handle, bursty loss occurs that the router is to discard some received packets randomly so as to lessen its loading. Thus, the receiving end cannot receive the data sent from the transmission end completely. In the case of discarding packets containing relatively unimportant information of the whole delivered information, the influence on the reading and using of the whole delivered information is insignificant. However, in the case of discarding packets containing important portion of the whole delivered information, the influence on the reading and using of the whole delivered information is significant. In this way, the quality of service (QoS) is reduced.

In order to reduce the influence of bursty loss due to network congestion on the quality of service, error recovery is applied. There are two conventional approaches to error recovery. One is automatic repeat request (ARQ) and the other is forward error correction (FEC). In ARQ, when a receiving end receives a packet from a transmission end, the receiving end sends an acknowledge message to the transmission end. After receiving the acknowledgment message from the receiving end, the transmission end sends the next packet. If the transmission end does not receive the acknowledgment message from the receiving end within a predetermined time period, it indicates that the packet could be discarded by the router and thus was not delivered to the receiving end. Thus, the transmission end re-transmits the packet so that the receiving end can receive the packet correctly. In FEC, a number of redundancy packets are added to each packet to be sent. In addition, if the number of packets which are discarded by the router due to network congestion does not exceed the number of the packets added to each packet, the discarded packets are recoverable at the receiving end.

When ARQ approach is applied, a predetermined time is set at the transmitting end, and the transmitting end waits for the response of the receiving end within the predetermined time. If the predetermined time is insufficiently short, it may occur that the transmitting end does not receive the response packet after waiting for the predetermined time, and the packet, in fact, is not discarded and the response packet is delayed due to network congestion. Because of the misinterpretation, the transmission end re-transmits the packet that has been received by the receiving end. In this way, the network traffic is increased and the loading of the router is increased. On the other hand, if the predetermined time is too long, the time between succeeding transmitted packets is long as well. For transmitting real-time multimedia information, if the time between succeeding transmitted packets is long, the multimedia information cannot be played at the receiving end in a real-time manner. Thus, it affects the quality of service of the multimedia information provided by the network. Further, the error detection time for re-transmitting packets are related to the predetermined time and the degree of network congestion which cannot be predicted such that the predetermined time is difficult to be determined. Moreover, it may occur that the packet sent by the transmission end is not discarded but the response packet sent by the receiving end is discarded by the router. In this case, the transmission end re-transmits the packet due to the misinterpretation, and hence the network bandwidth is wasted on retransmission, and the loading of the router is increased.

If FEC approach is applied, the disadvantage of ARQ approach does not occur since FEC approach is not to re-transmit packets for resolving the problem of burty loss, but to add a number of redundancy packets to each packet. In addition, the more important the information is, the more the redundancy packets are added to the packets of the information. In this way, data recovery of the packets becomes more probable. However, in the case of network congestion, the addition of the redundancy packets makes the degree of network congestion worse, occupies more bandwidth, and increases the loading of the router so that bursty loss occurs easily.

Motion Picture Experts Group (MPEG) standard is the widely used standard for video coding and compression. Thus, MPEG standard is taken as an example as follows. In MPEG standard, there are three types of video frame: I-frame, P-frame, and B-frame. Multimedia information is stored by using a group of pictures (GOP) as the data storage unit, and a GOP includes fifteen frames, each of which contains one I-frame, four P-frames, and ten B-frames.

Referring to FIG. 2, it illustrates the relation among different frames of a GOP in MPEG format. In FIG. 2, $X_j^i$ is an identifier indicating the j-th X type video frame of the i-th GOP. For instance, $B_2^1$ indicates the second B-frame of the first GOP. In addition, the arrows among the identifiers indicate which of the frames (pointed to by an arrowhead) required to be referred to when a frame is being read. In FIG. 2, data of an I-frame is to be compressed completely with the Joint Photographic Experts Group (JPEG) format. Data of each P-frame stores the difference between the P-frame and either a previous I-frame or P-frame. Data of each B-frame stores the differences between the B-frame, either a previous I-frame or P-frame, and either a next I-frame or P-frame. Therefore, I-frame type is the largest frame type in data size, and the P-frame type is larger than the B-frame type in data size, wherein the B-frame type is the smaller frame type in data size. The display for an I-frame can be derived from I-frame directly. As for obtaining the display for a P-frame, an I-frame is to be referred to. In addition, for obtaining the display for a B-frame, both an I-frame and a P-frame are to be referred to. As described above, the characteristic of the decoding of a frame type that involves referring to other types of frames is called interframe dependency. Since MPEG compression format is of interframe dependency, importance of each frame type is different and the importance of a frame type is determined by the degree of being referred to. The more a frame is to be referred to by the other frames, the more important the frame to be referred to is. For MPEG format, the sequence of importance of frame types measured from the most to the less is: I-frame>P-frame>B-frame.

Moreover, since MPEG format has interframe dependency, data of the frames of higher importance have to be transmitted to the receiving end more completely in the course of network transmission so that the multimedia information can be decoded and used at the receiving end smoothly. If data of the I-frame are not completely received by the receiving end, the multimedia information cannot be decoded at the receiving end even if the subsequent B-frames and P-frames of the GOP are transmitted to the receiving end successfully. Likewise, if data of the P-frames are not received, the relevant B-frames cannot be decoded successfully.

Referring to FIG. 3A, it illustrates a conventional method for determining a transmission sequence of the packets of a GOP in MPEG format, wherein the GOP has six packets of I-frames, ten packets of P-frames, and twelve packets of B-frames. In FIG. 3A, letters i, p, and b denote one I-frame, P-frame, and B-frame packets respectively. The conventional method is to transmit the packets according to their importance. Firstly, the most important I-frame packets are transmitted. Then, the less important P-frame packets are transmitted. Finally, the B-frame packets are transmitted.

Bursty loss, as described above, occurs in a network that a router discards a set of contiguous packets at a time. Referring to FIGS. 3B to 3D, they illustrate burty loss when packets of multimedia information in MPEG format are transmitting by using the conventional method. In FIGS. 3B to 3D, a dotted rectangle is used to encircle the discarded packets when bursty loss occurs. Turning to FIG. 3B, when bursty packet loss occurs so that frame packets of less importance, such as the packets 302, are discarded, the influence on the receiving of the other frames of the GOP is insignificant. However, as shown in FIGS. 3C and 3D, when frame packets of high importance, such as the packets 304 in FIG. 3C or the packets 306 in FIG. 3D, are discarded, the other frames of the GOP will not be decoded and used successfully.

In brief, the conventional method has the following disadvantages.

1. When using ARQ technique, it is difficult to determine the predetermined time optimally since network congestion cannot be predicted. In addition, it may occur that the response packet sent from the receiving end is discarded by the router so that the transmission end re-transmits the packets.

2. When using FEC technique, a specific number of redundancy packets are added. In the case of network congestion, the addition of redundancy packets would make the degree of network congestion worse and bursty loss occur more easily.

3. For multimedia information stored and transmitted in a compression format of interframe dependency, when bursty loss occurs in frames of higher importance, the other frames, which are received completely, cannot be decoded and utilized.

SUMMARY OF THE INVENTION

It is therefore an object of the invention to provide a method for transmitting multimedia data packets in a network so as to reduce the probability of multimedia data packets of higher importance to be discarded during transmitting multimedia data packets, and the influence of bursty loss on the quality of service at the receiving end.

According to the object of the invention, it is to provide a method for packet transmission of multimedia data in a network. The method is used for transmitting a group of pictures (GOP), wherein the GOP includes a plurality of frames, each of the frames includes a plurality of packets. In addition, the frames are of N types of frame, a first to an N-th type of frame, and a packet of a frame of a type of frame is called the packet of the type of frame. The method includes the steps as follows. (a) Set i to one, where i is a positive integer. (b) Form an i-th transmission sequence by arranging the packets of the i-th type of frame. (c) Form an (i+1)-th transmission sequence by putting the packets of the (i+1)-th type of frame between packets of the i-th transmission sequence consecutively. (d) Increment i by one. (e) Repeat steps (c) to (d) until i is equal to N. (f) Transmit the N-th transmission sequence.

According to the object of the invention, it is to provide a method for packet transmission of multimedia data in a network. The method is used for transmitting M groups of pictures (GOPs) including a first GOP to an M-th GOP, where M is an integer greater than one. Each of the GOPs includes at most N frames, and each of the frames includes at most P packets, where N and P are integers greater than one. The method includes the steps as follows. (a1) Set i to one, wherein i is a positive integer. (a2) Set j to one, wherein j is a positive integer. (a3) It is to determine whether a first type of frame of the j-th GOP has a packet number greater than i; if not, the method proceeds to step (a5). (a4) Form a first transmission sequence by putting an i-th packet of the first type of frame of the j-th GOP into the first transmission sequence consecutively. (a5) Increment j by one. (a6) Repeat steps (a3) to (a5) until j is greater than M. (a7) Increment i by one. (a8) Repeat steps (a2) to (a7) until i is greater than P. (b1) Set i to one, wherein i is a positive integer. (b2) Set j to one, wherein j is a positive integer. (b3) Set k to one, wherein k is a positive integer. (b4) It is to determine whether the k-th GOP has a frame number greater than i; if not, the method proceeds to step (b7). (b5) It is to determine whether the (i+1)-th type of frame of the k-th GOP has a frame number greater than j; if not, the method proceeds to step (b7). (b6) Put the j-th packet of the (i+1)-th type of frame in the k-th GOP between packets of the i-th transmission sequence consecutively. (b7) Increment k by one. (b8) Repeat steps (b4) to (b7) until k is greater than M. (b9) Increment j by one. (b10) Repeat steps (b3) to (b9) until j is greater than P. (b11) Form an (i+1)-th transmission sequence by putting the packets of the frames of the (i+1)-th type of the GOPs between the packets of the i-th transmission sequence consecutively. (b12) Increment i by one. (b13) Repeat steps (b2) to (b12) until i is equal to N. (b14) Transmit the N-th transmission sequence.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 3A (Prior Art) illustrates a conventional method for determining a transmission sequence of the packets of a GOP in MPEG format;

FIG. 3B (Prior Art) illustrates that bursty loss occurs in B-frame packets during transmission multimedia data packets in MPEG format;

FIG. 3C (Prior Art) illustrates that bursty loss occurs in P-frame packets during transmission multimedia data packets in MPEG format;

FIG. 3D (Prior Art) illustrates that bursty loss occurs in I-frame packets during transmission multimedia data packets in MPEG format;

FIG. 5A illustrates a transmission sequence for the I-frame and P-frame packets of a GOP according to a preferred embodiment of the invention;

FIG. 5B illustrates a transmission sequence for the I-frame, P-frame, and B-frame packets of a GOP according to a preferred embodiment of the invention;

DESCRIPTION OF THE PREFERRED EMBODIMENT

The principle of the invention is that when packets to be transmitted through a network are of different degree of importance, the packets of higher importance are spreaded out and arranged in transmission sequences. In addition, it is to reduce the probability of multimedia data packets of higher importance to be discarded during transmitting multimedia data packets, and the influence of bursty boss on the quality of service at the receiving end.

Figure 4:
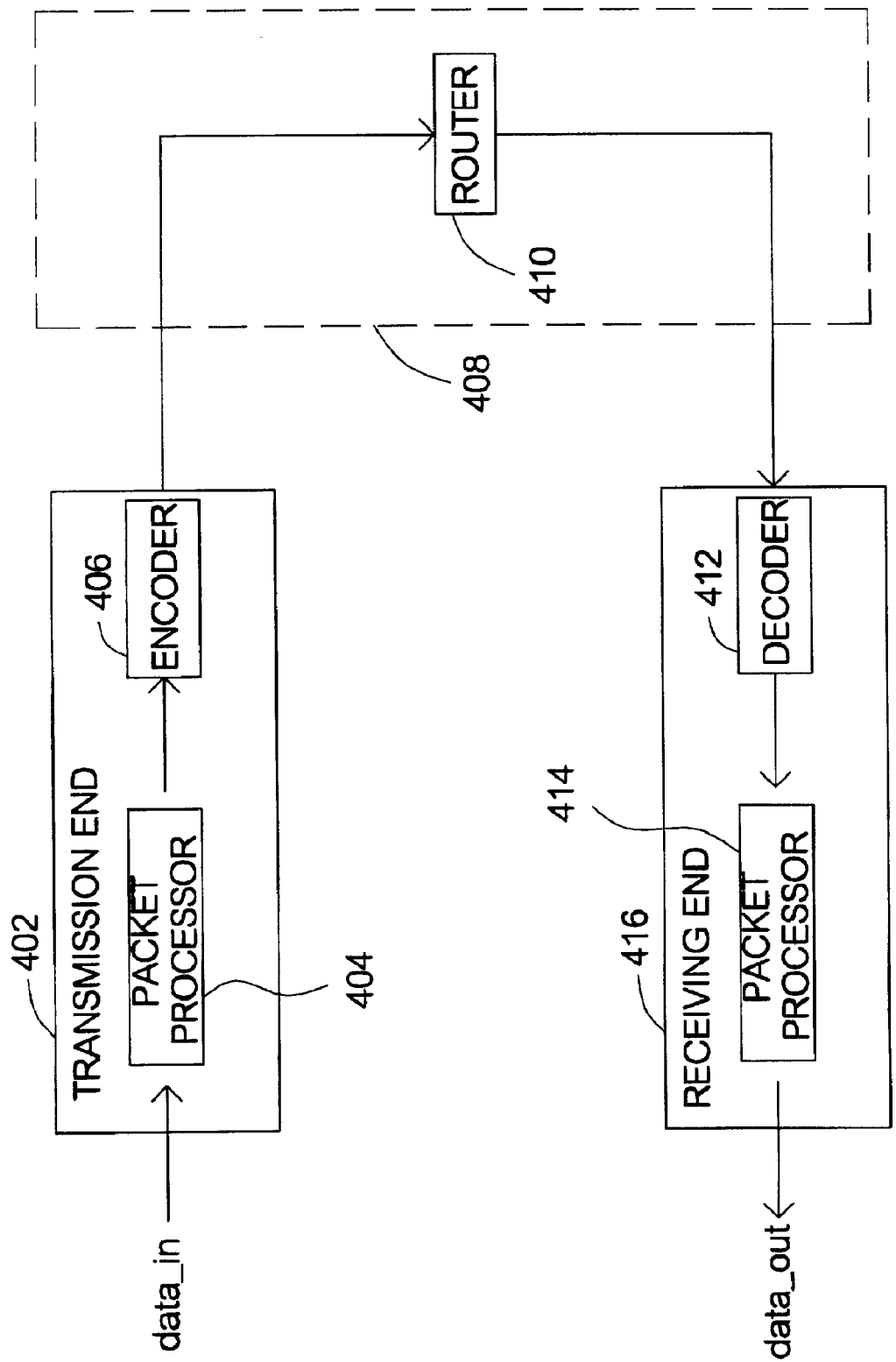
FIG. 4 illustrates a network transmission system for determining a transmission sequence for the packets of a GOP according to a preferred embodiment of the invention.

Referring to FIG. 4, it illustrates a network transmission system for determining a transmission sequence for the packets of a GOP according to a preferred embodiment of the invention. The network transmission system includes a transmission end 402, and one or more receiving ends such as a receiving end 416. The receiving end 416 may submit a request for multimedia service to transmission end 402. On receiving the request from the receiving end 416, transmission end 402 transmits multimedia data which are stored and compressed in the transmitting end in advance to one or more transmission ends in a way of unicast or multicast in real-time. The receiving end 416 receives the contiguous data, decompresses them, and play the decompressed multimedia data in real-time.

When receiving the request from the receiving end 416, transmission end 402 divides pre-compressed multimedia data into a series of data packets. For example, every frame of a video file in MPEG format is divided into a series of data packets. Then, the packets are sent to a packet processor 404 to determine transmission sequences of the packets which are to be transmitted to the receiving end 416.

Since the problem of bursty packet loss in a router may cause users unable to use the multimedia data received at the receiving end, a method for packet transmission of multimedia data in a network according to the invention is to resolve this problem and is described as follows.

Referring to FIG. 5A, it illustrates a transmission sequence for the I-frame and P-frame packets of a GOP according to a preferred embodiment of the invention, wherein $x_i$ denotes the i-th packet of X frame. Firstly, the first transmission sequence is formed by arranging packets of I-frames. Then, packets of secondarily important P-frames are put between successive packets of the I-frames consecutively. Since the packet number of the P-frames is greater than the packet number of the I-frames, when the successive packets of the I-frames have the packets of the P-frames put between, there are a portion of packets of the P-frames left to be arranged into the transmission sequences. In this case, the portion of packets of the P-frames left to be arranged are put between the successive packets of a current transmission sequence from the header of the current transmission sequence consecutively. In FIG. 5A, after packet $p_5$ is put between packets $i_5$ and $i_6$, the arrangement of packet is started again from the beginning of the transmission sequence to put packet $p_6$ between packets $i_1$ and $p_1$. By using the method described above to arrange the other packets of the P-frames, the second transmission sequence is obtained as shown in FIG. 5A.

Referring to FIG. 5B, it illustrates a transmission sequence for the I-frame, P-frame, and B-frame packets of a GOP according to a preferred embodiment of the invention. After the determination of the transmission sequence for the I-frame and P-frame packets, the less important B-frame packets are arranged after the last P-frame packet. In this way, packet $b_1$ is put after the last P-frame packet $p_{10}$ and is put between the packets $P_3$ and $i_4$. Then, according to the arrangement for the P-frame packets, the remaining B-frame packets are arranged. By using the method described above to arrange the other packets of the B-frames, the third transmission sequence is obtained as shown in FIG. 5B.

By the method described above, the packet processor 404 determines the transmission sequence of the packets. After that, the packets are sent to an encoder 406 of transmission end 402 according to the third transmission sequence for encoding, and then encoded packets are delivered to the receiving end via the network. When receiving the encoded packets, the receiving end 406 decodes them by using a decoder 412, and puts the decoded packets in original order by using a packet processor 414. Then, the multimedia data can be read and used at the receiving end 416.

Figure 6A:
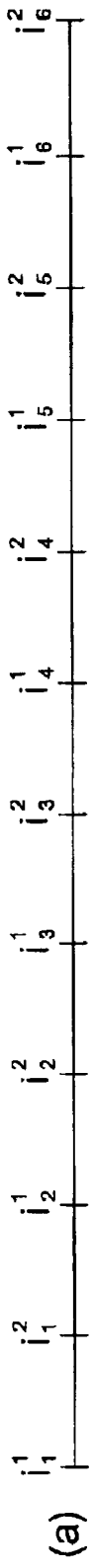
FIG. 6A illustrates a transmission sequence for the I-frame packets of two GOPs according to a preferred embodiment of the invention.
Figure 6B:
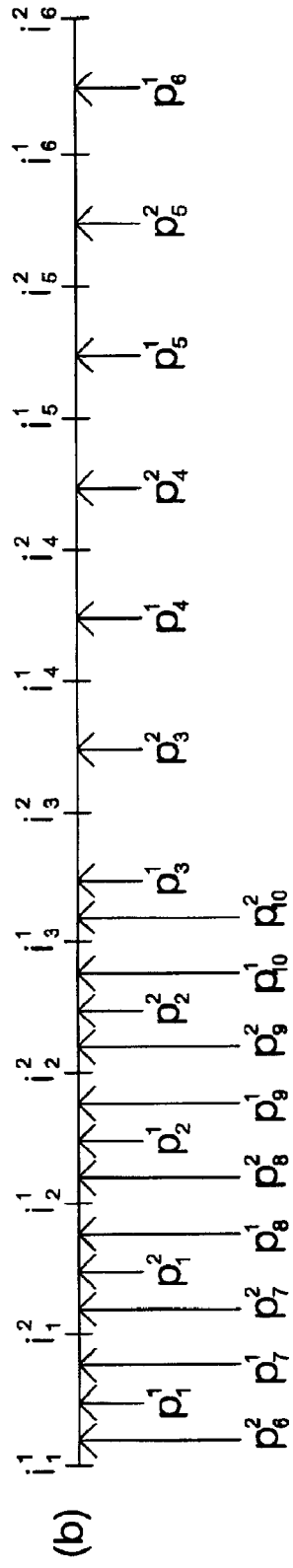
FIG. 6B illustrates a transmission sequence for the I-frame and P-frame packets of two GOPs according to a preferred embodiment of the invention.
Figure 6C:
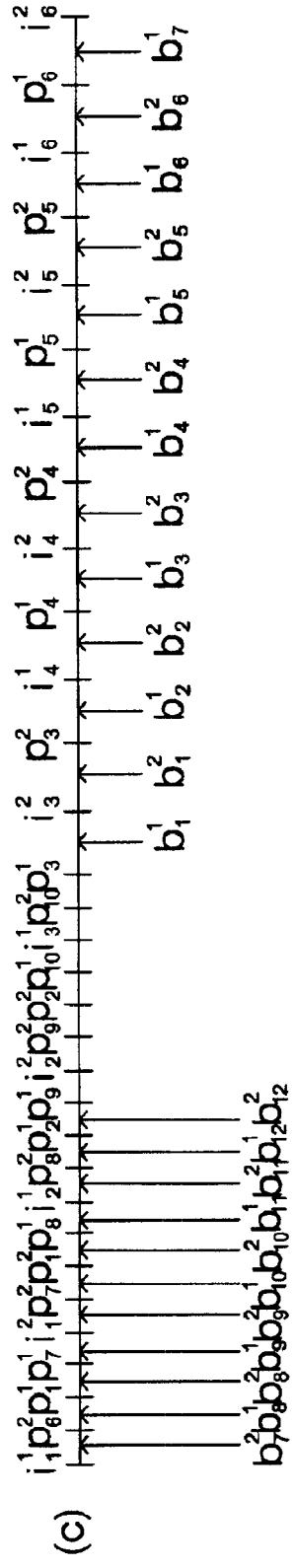
FIG. 6C illustrates a transmission sequence for the I-frame, P-frame, and B-frame packets of two GOPs according to a preferred embodiment of the invention.

By using the invention, two or more GOPs are enabled to be used as a basic unit for the arrangement of transmission sequences of packets. Referring to FIGS. 6A to 6C, they illustrate the determination of transmission sequence of packets of two GOPs as another embodiment of the invention. In addition, each of the two GOPs has six I-frame packets, ten P-frame packets, and twelve B-frame packets. In FIGS. 6A to 6C, characters i, p, and b denote an I-frame packet, a P-frame packet, and a B-frame packet respectively, and $x_j^i$ denotes the j-th packet of X-type frames of the i-th GOP. For instance, $b_2^1$ denotes the second packet of B-frames of the first GOP.

Referring to FIG. 6A, it illustrates a transmission sequence for the I-frame packets of two GOPs according to a preferred embodiment of the invention. First, a first transmission sequence is formed by arranging I-frame packets of the two GOPs in an alternate manner. The first packet of I-frames of the first GOP ($i_1^1$) is first put into the transmission sequence, and then the first packet of I-frames of the second GOP ($i_1^2$) is put into it. Next, the second packet of I-frames of the first GOP ($i_2^1$) is first put into the transmission sequence, followed by the second packet of I-frames of the second GOP ($i_2^2$) is put into it. Similarly, the other packets are put into the transmission sequence in the alternate manner. After the last packet of the I-frames of the first GOP ($i_6^1$) and the last packet of the I-frames of the second GOP ($i_6^2$) are put into the transmission sequence, the first transmission sequence is obtained as shown in FIG. 6A.

Referring to FIG. 6B, it illustrates a transmission sequence for the I-frame and P-frame packets of two GOPs according to a preferred embodiment of the invention. After the determination of the arrangement of the packets of the I-frames of the two GOPs in the first transmission sequence, a second transmission sequence is formed by putting packets of P-frames of the two GOPs into the first transmission sequence. In the insertion, the I-frame packets of different GOPs are regarded as the same kind of I-frame packets and hence a P-frame packet is put between two adjacent I-frame packets. Since the packet number of the P-frames is greater than the packet number of the I-frames, when packet $p_6^1$ is put into the first transmission sequence, it is already in the end of the first transmission sequence. In this case, the arrangement of the following packets starts from the leading end of the first transmission sequence. That is, the following P-frame packets are to be put between the successive packets of the leading end of the transmission sequence consecutively. For instance, packet $p_6^2$ is put between the packets $i_1^1$ and $p_1^1$. Following the same way of insertion of the P-frame packets for the two GOPs, the second transmission sequence is obtained as shown in FIG. 6B.

Referring to FIG. 6C, it illustrates a transmission sequence for the I-frame, P-frame, and B-frame packets of two GOPs according to a preferred embodiment of the invention. After the second transmission sequence is formed by putting all of the P-frame packets into the first transmission sequence, the B-frame packets are to be put into the second transmission sequence sequentially following the same way of insertion of the last P-frame packet so as to form a third transmission sequence. That is, the B-frame packets are put between successive packets of the packets following the last P-frame packet $p_{10}^2$ consecutively. For instance, packet $b_1^1$ is put between the packets $p_3^1$ and $i_3^2$. Following the same way of insertion for putting the B-frame packets for the two GOPs into the second transmission sequence, the third transmission sequence is obtained as shown in FIG. 6C.

According to the invention, a plurality of GOPs can be used as a basic unit for the arrangement of transmission sequences. When it is required to transmit N GOPs, each frame of data of each GOP is firstly divided into a series of packets before transmission. Secondly, packets of the frames of the first type for all GOPs are arranged so as to form a first transmission sequence. That is, the first packet of the frames of the first type for the first GOP is put into a transmission sequence, and then that for the second GOP is put into the transmission sequence. Similarly, this insertion is repeated for the other GOP in sequence until the first packet of the frames of the first type for the N-th GOP is done. Next, the second packet of the frames of the first type for the first GOP is put into the transmission sequence, and then that for the second GOP is put into the transmission sequence. Similarly, this insertion is repeated for the other GOP in sequence until the second packet of the frames of the first type for the N-th GOP is done. Further, in a similar way, the insertion is repeated for other packets for the N GOPs sequentially, and the last packet of the frames of the first type for the first GOP is put into the transmission sequence, and then that for the second GOP is put into the transmission sequence. Likewise, this insertion is repeated sequentially until the last packet of the frames of the first type for the N-th GOP is put into the transmission sequence. In this way, the first transmission sequence is formed. Then, in order to form the second transmission sequence packets of the frames of the second type for every GOP are put into the first transmission sequence sequentially such that they are put between successive packets of the first transmission sequence consecutively. After that, packets of the frames of the other type for every GOP are put into the current transmission sequence sequentially to form the next transmission sequence until the N-th transmission sequence is formed by putting packets of the frames of the N-th type for every GOP into the (N−1)-th transmission sequence. Finally, when transmission the N GOPs, the packets of the GOPs are transmitted according to the N-th transmission sequence.

The method and system provided by the invention can be implemented with data recovery technique, such as ARQ or FEC technique. If ARQ technique is applied, since the probability and number of I-frames being discarded due to bursty loss are reduced, data and time for retransmission are reduced. If FEC technique is applied, since the probability and number of packets of I-frames and B-frames, which are of higher importance, being discarded due to bursty loss are reduced, the required redundancy packets are reduced. In this way, the problem that a plenty of redundancy packets make the network congestion worse can be avoided. Moreover, since FEC technique does not involve packet retransmission, it is more appropriate for use in transmission of multimedia data in real-time. Therefore, when transmitting multimedia data through the network, FEC technique is preferred to be used in the implementation of the invention.

Figure 1:
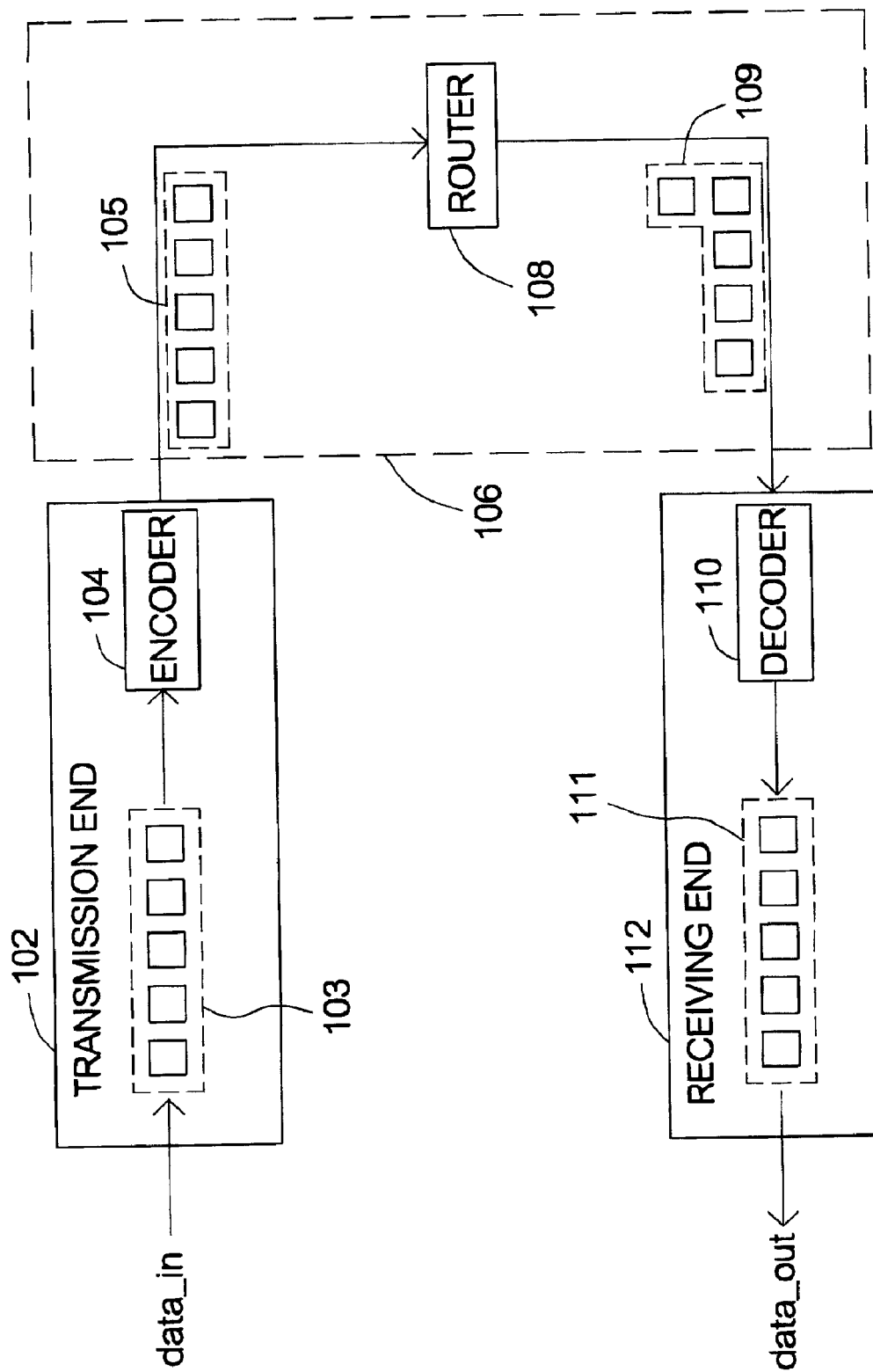
FIG. 1 (Prior Art) illustrates a conventional network transmission system.
Figure 2:
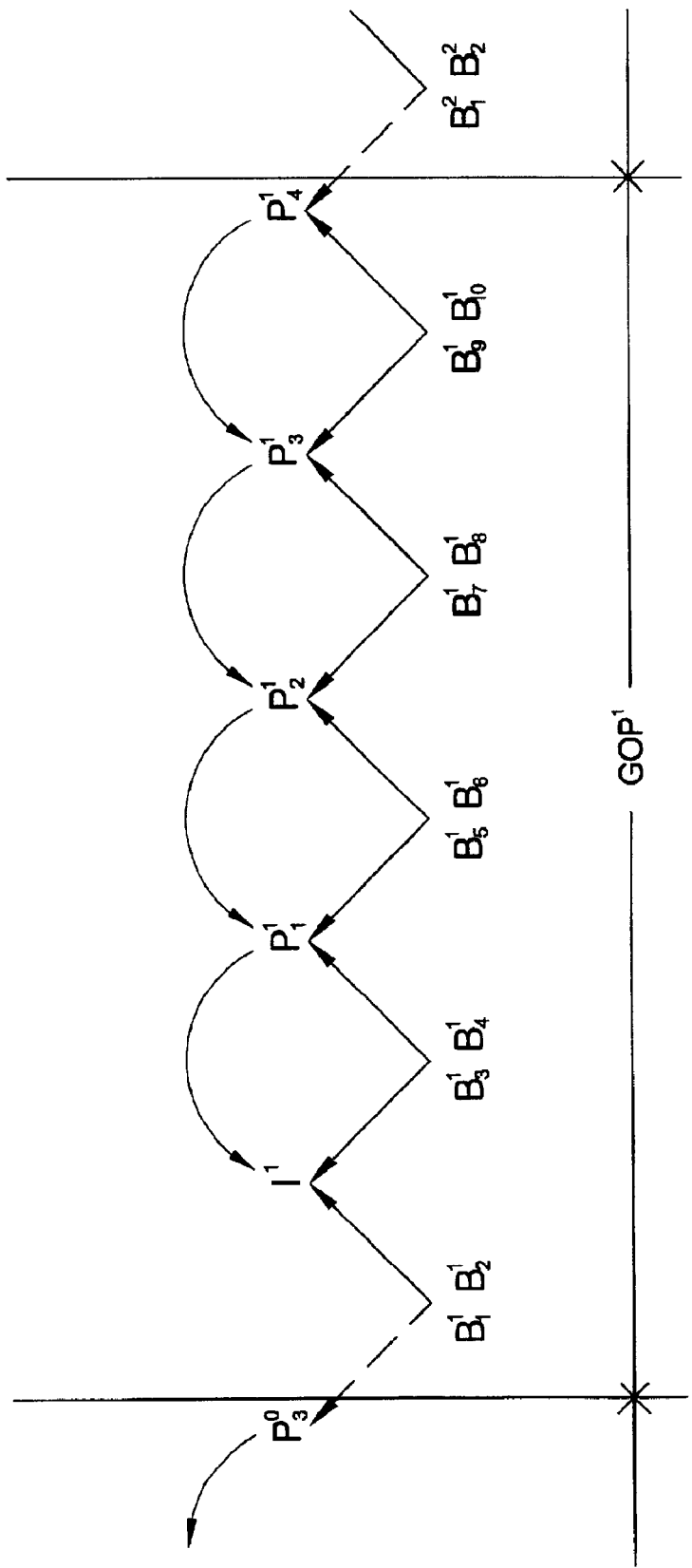
FIG. 2 (Prior Art) illustrates the relation among different frames in a group of pictures (GOP) in MPEG format.
Figure 7:
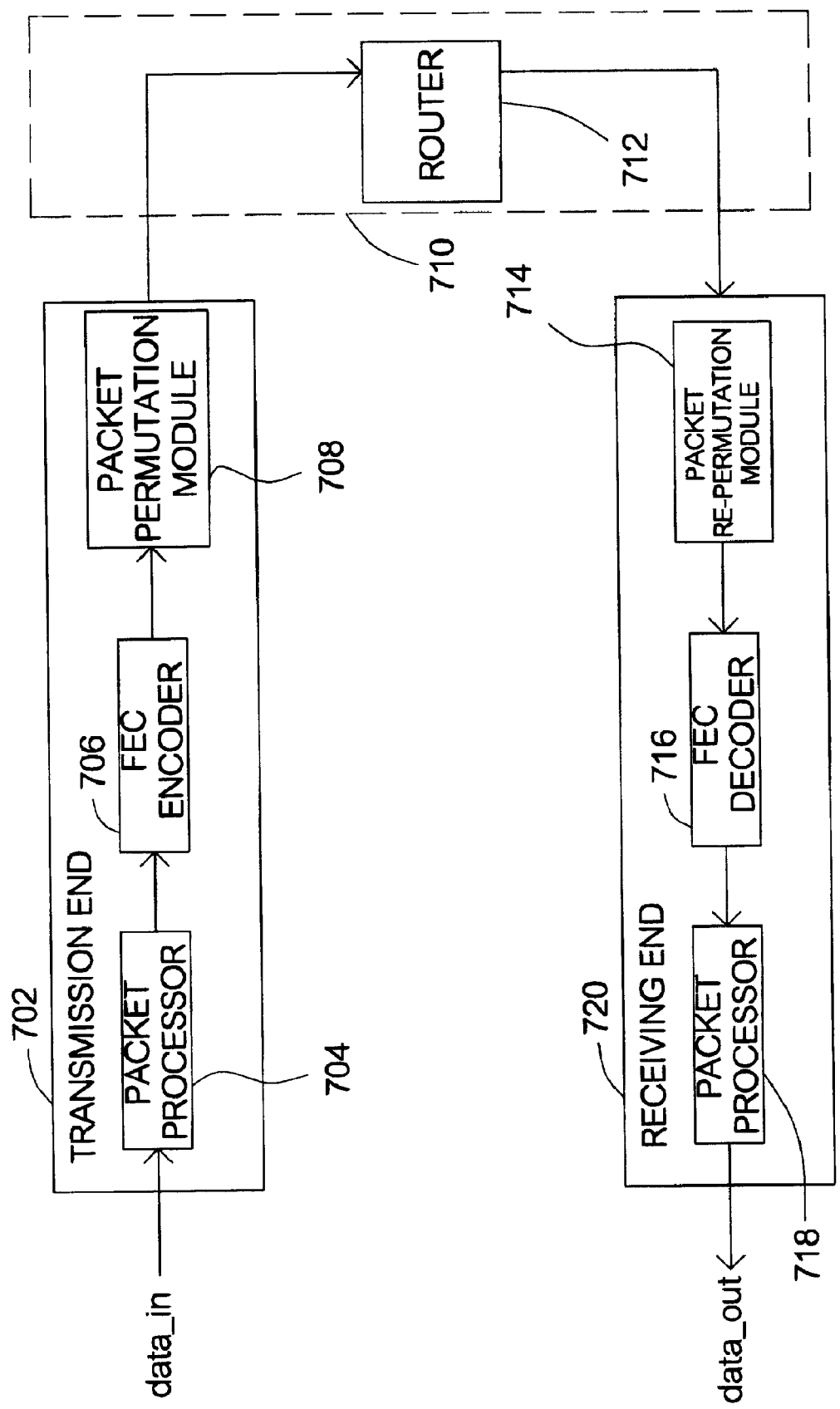
FIG. 7 illustrates a network transmission system for transmitting the packets of a GOP according to a preferred embodiment of the invention incorporating with forward error correction.

Referring to FIG. 7, it illustrates a network transmission system for transmitting the packets of a GOP according to a preferred embodiment of the invention incorporating with forward error correction. In FIG. 7, the difference between FIG. 2 and FIG. 7 is that an encoder 706 of a transmitting end 702 in FIG. 7 employs FEC technique to encode packets. In addition, a packet permutation module is coupled to the encoder 706 to add redundancy packets to the encoded packets. The redundancy packets and the packets in predetermined order are transmitted as a whole. On the other hand, a packet re-permutation module 714, coupled to a decoder 716 of a receiving end 720, is used to perform the reverse operation so as to separate the redundancy packets, wherein the decoder 716 performs decoding by using FEC technique.

Figure 8:
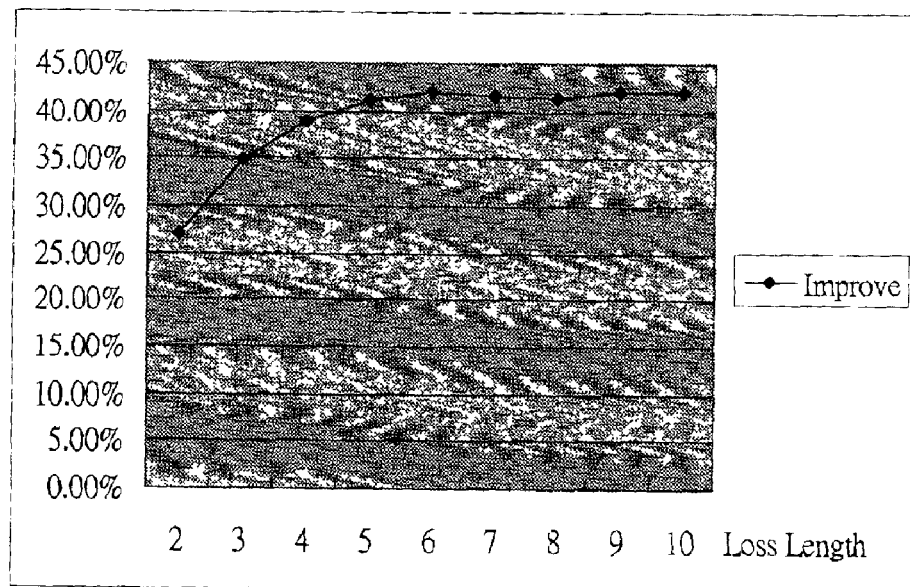
FIGS. 8, 9, and 10 show the results of simulation experiments of comparing the method for transmitting packets in a network according to the invention with the conventional transmission method respectively.
Figure 9:
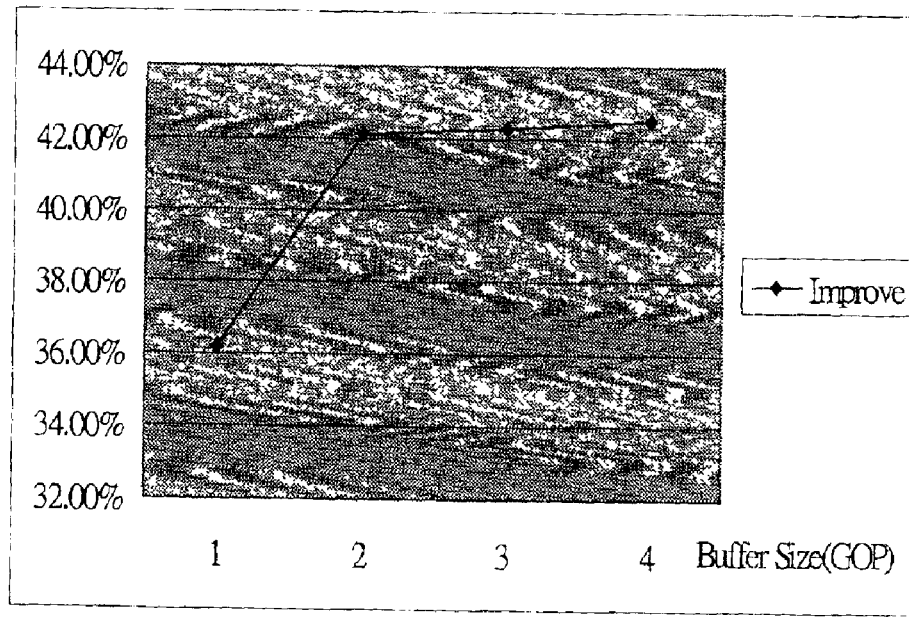
Figure 10:
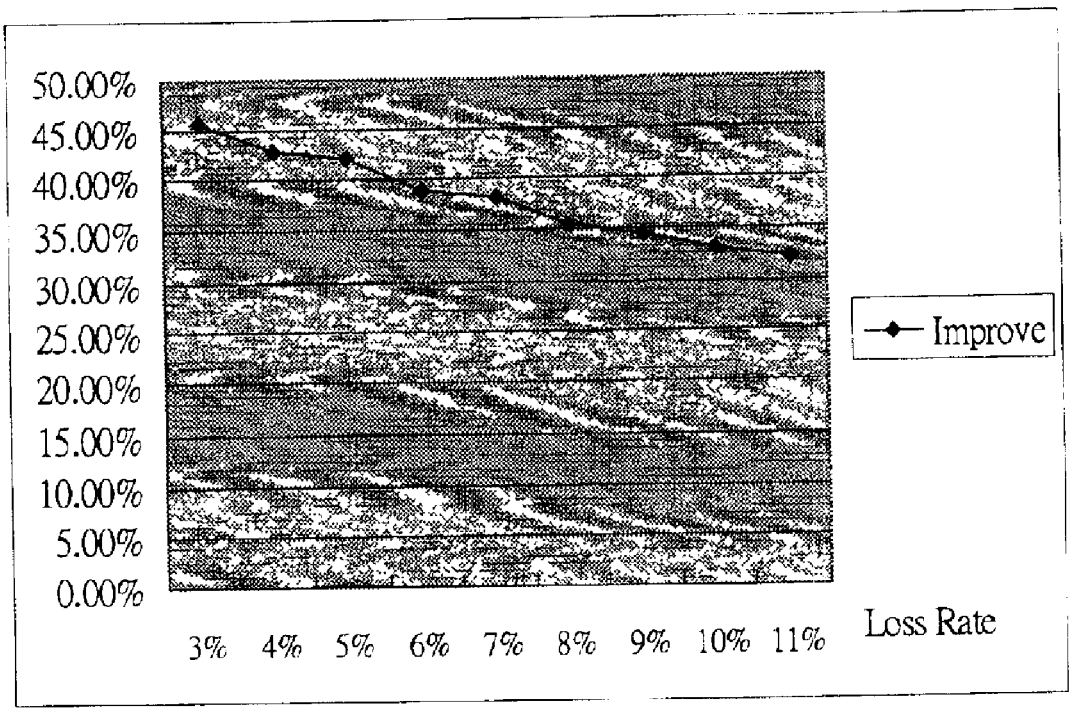

Referring to FIGS. 8, 9, and 10, they show the results of comparing the method according to the invention with the conventional transmission method by using computer simulation. In simulation, every GOP has fifteen frames and includes one I-frame, four P-frames, and ten B-frames. In addition, the I-frame, P-frame, and B-frame have 18750, 6250, and 2500 bytes respectively, and the maximum transfer unit (MTU) is 512 bytes. In this simulation experiment, Gilbert model is employed to model the characteristic bursty loss in the internet. The purpose of FIGS. 8 to 10 is to show the difference of the number of redundancy packets needed to be added to the packets between the method according to the invention combining with FEC technique and the convention transmission method combining with FEC technique when both methods are used to transmit the multimedia data in MPEG format with identical quality of service (QoS). The definition of QoS is to indicate the percentage of I-frame packet not lost in a GOB.

Referring to FIG. 8, it illustrates the simulation experiment results of comparing the method for transmitting packets in a network according to the invention with the conventional transmission method. In the simulation, the loss rate is set to 5% and QoS is set to 95%, that is, the probability of receiving complete I-frame packets in the receiving end that receives the GOPs is 95%. When multimedia data in MPEG format are transmitted under the conditions, it is to obtain reduction ratios of the number of redundancy packets needed to be added to the packets by using the method according to the invention combining with FEC technique to that of the conventional transmission method combining with FEC technique. It can be observed from FIG. 8, when bursty packet loss occurs, the reduction ratio ranges between 27% to 43%. In addition, as the number of lost packet increases, the number of redundancy packets according to the invention is reduced as compared with the conventional method.

Referring to FIG. 9, it illustrates the simulation experiment results of comparing the method for transmitting packets in a network according to the invention with the conventional transmission method. In the simulation, the loss rate is set to 5%, QoS is set to 95%, and average number of packets dropped in a bursty loss is set to three packets. When multimedia data in MPEG format are transmitted under the conditions, it is to obtain reduction ratios of the number of redundancy packets needed to be added to the packets by using the method according to the invention combining with FEC technique to that of the conventional transmission method combining with FEC technique. As observed from FIG. 9, when bursty packet loss occurs, the reduction ratio ranges between 36% to 43%. In addition, as the number of GOP increases, the number of redundancy packets according to the invention is reduced as compared with the conventional method.

Referring to FIG. 10, it illustrates the simulation experiment results of comparing the method for transmitting packets in a network according to the invention with the conventional transmission method. In the simulation, the loss rate is set to 5%, QoS is set to 95%, average number of packets dropped in a bursty loss is set to three packets, and two GOPs are required to be transmitted. When multimedia data in MPEG format are transmitted under the conditions, as the probability of the occurrence of bursty loss increases, the number of redundancy packets needed to be added to the packets by using the method according to the invention combining with FEC technique is reduced as compared with that of the conventional transmission method combining with FEC technique. As observed from FIG. 10, when bursty packet loss occurs, the reduction ratio ranges between 32% to 43%. Although, as the probability of the occurrence of bursty loss increases, it is required more redundancy packets according to the invention for maintaining identical QoS, the number of redundancy packets according to the invention is much less than that of the conventional method.

In the above embodiment, the multimedia data in MPEG format are transmitted in the Internet for the illustration of the invention. In addition to transmission of the multimedia data in MPEG format in the Internet, the invention can be applied to the transmission of continuous multimedia data in other interframe dependent format in a network where bursty packet loss phenomenon occurs.

As described above, the method for packet transmission of multimedia data in a network according to the invention has the following advantages.

1. Reducing the influence of bursty packet boss on the quality of service at the receiving end. By the permutation of the sequence for transmission according to the invention, the data packets of higher importance are transmitted distributively through the transmission sequence. Hence, when bursty loss occurs due to network congestion, the number of discarded data packets of higher importance is reduced. In this way, the influence of bursty boss on the quality of service at the receiving end is reduced.

2. Resolving the disadvantage of the conventional transmission technique. The method and system provided by the invention can be implemented with data recovery technique, such as ARQ or FEC technique. If ARQ technique is applied, data and time for retransmission are reduced. If FEC technique is applied, the required redundancy packets are reduced. In this way, the problem that a plenty of redundancy packets make the network congestion worse can be avoided.

3. After the permutation of the frame packets of multiple GOPs according to invention, frame packets of higher importance are spaced apart from one another. In this way, the influence of bursty packet loss is reduced more much.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for packet transmission of multimedia data in a network, the method being for transmitting a group of pictures (GOP), the GOP including a plurality of frames, each of the frames including a plurality of packets, wherein the plurality of frames are of N types of frame, a first to an N-th type of frame, and a packet of a frame of a type of frame is called the packet of the type of frame, the method comprising the steps of:

(a) setting i to one, where i is a positive integer;
(b) forming an i-th transmission sequence by arranging the packets of the i-th type of frame;
(c) forming an (i+1)-th transmission sequence by putting the packets of the (i+1)-th type of frame between packets of the i-th transmission sequence consecutively;

(d) incrementing i by one;

(e) repeating said steps (c) to (d) until i is equal to N; and (f) transmitting the N-th transmission sequence.

2. A method according to claim 1, wherein said step (c) comprises the steps of:

(c1) determining whether the packets of the i-th type of frame are put into the i-th transmission sequence so that a last packet of the i-th type of frame is placed in a location adjacent to a last packet of the i-th transmission sequence; if yes, proceeding to step (c4); if not, proceeding to step (c2);

(c2) after the last packet of the i-th type of frame in the i-th transmission sequence, putting the packets of the (i+1)-th type of frame between the packets of the i-th transmission sequence consecutively;

(c3) proceeding to step (c5);

(c4) from a first packet of the i-th transmission sequence, putting the packets of the (i+1)-th type of frame between the packets of the i-th transmission sequence consecutively;

(c5) determining whether the packets of the (i+1)-th type of frame are put into the i-th transmission sequence so that a last packet of the (i+1)-th type of frame is placed in a location adjacent to the last packet of the i-th transmission sequence; if yes, proceeding to step (c6); if not, proceeding to step (c8);

(c6) from the first packet of the i-th transmission sequence, putting the packets of the (i+1)-th type of frame which have not been put into the i-th transmission sequence between the packets of the i-th transmission sequence consecutively;

(c7) proceeding to said step (c5); and (c8) obtaining the (i+1)-th transmission sequence after the packets of the (i+1)-th type of frame are placed between the packets of the i-th transmission sequence consecutively.

3. A method according to claim 1, wherein the first type of frame is of the highest importance.

4. A method according to claim 1, wherein the network has busty packet loss.

5. A method according to claim 4, wherein the network is an internet.

6. A method according to claim 1, wherein the multimedia data is of a compression format, and the compression format is of interframe dependency.

7. A method according to claim 6, wherein the compression format is Motion Picture Experts Group (MPEG) format.

8. A method according to claim 7, wherein N is equal to three, the first type of frame is I-frame, the second type of frame is P-frame, and the third type of frame is B-frame.

9. A method according to claim 1, being capable of being implemented with an error recovery, wherein the error recovery is either automatic repeat request (ARQ) or forward error correction (FEC).

10. A method for packet transmission of multimedia data in a network, the method being for transmitting M groups of pictures (GOPs) including a first GOP to an M-th GOP, each of the GOPs including at most N frames, each of the frames including at most P packets, where M, N and P are integers greater than one, the method comprising the steps of:

(a1) setting i to one, wherein i is a positive integer;

(a2) setting j to one, wherein j is a positive integer;

(a3) determining whether a first type of frame of the j-th GOP has a packet number greater than i; if not, proceeding to step (a5);

(a4) forming a first transmission sequence by putting an i-th packet of the first type of frame of the j-th GOP into the first transmission sequence consecutively;

(a5) incrementing j by one;

(a6) repeating said steps (a3) to (a5) until j is greater than M;

(a7) incrementing i by one;

(a8) repeating said steps (a2) to (a7) until i is greater than P;

(b1) setting i to one, wherein i is a positive integer;

(b2) setting j to one, wherein j is a positive integer;

(b3) setting k to one, wherein k is a positive integer;

(b4) determining whether the k-th GOP has a frame number greater than i; if not, proceeding to step (b7);

(b5) determining whether the (i+1)-th type of frame of the k-th GOP has a frame number greater than j; if not, proceeding to step (b7);

(b6) putting the j-th packet of the (i+1)-th type of frame in the k-th GOP between packets of the i-th transmission sequence consecutively;

(b7) incrementing k by one;

(b8) repeating said steps (b4) to (b7) until k is greater than M;

(b9) incrementing j by one;

(b10) repeating said steps (b3) to (b9) until j is greater than P;

(b11) forming an (i+1)-th transmission sequence by putting the packets of the frames of the (i+1)-th type of the GOPs between the packets of the i-th transmission sequence consecutively;

(b12) incrementing i by one;

(b13) repeating said steps (b2) to (b12) until i is equal to N; and (b14) transmitting the N-th transmission sequence.

11. A method according to claim 10, wherein the first type of frame is of the highest importance.

12. A method according to claim 10, wherein the network has busty loss.

13. A method according to claim 10, wherein the network is an internet.

14. A method according to claim 10, wherein the multimedia data is of a compression format, and the compression format is of interframe dependency.

15. A method according to claim 14, wherein the compression format is Motion Picture Experts Group (MPEG) format.

16. A method according to claim 15, wherein N is equal to three, the first type of frame is I-frame, the second type of frame is P-frame, and the third type of frame is B-frame.

17. A method according to claim 10, being capable of being implemented with an error recovery, wherein the error recovery is either automatic repeat request (ARQ) or forward error correction (FEC).

* * * * *